(12) United States Patent
Zhang

(10) Patent No.: US 11,171,725 B2
(45) Date of Patent: Nov. 9, 2021

(54) MOBILE TERMINAL

(71) Applicant: GUANGDONG OPPO MOBILE TELECOMMUNICATIONS CORP., LTD., Guangdong (CN)

(72) Inventor: Ye Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/912,160

(22) Filed: Jun. 25, 2020

(65) Prior Publication Data

US 2020/0412449 A1 Dec. 31, 2020

(30) Foreign Application Priority Data

Jun. 28, 2019 (CN) .......................... 201910577344.1

(51) Int. Cl.
*H04B 10/116* (2013.01)
*H04B 10/114* (2013.01)
*H04W 4/80* (2018.01)
*H05B 47/195* (2020.01)

(52) U.S. Cl.
CPC ............ *H04B 10/116* (2013.01); *H04W 4/80* (2018.02); *H05B 47/195* (2020.01)

(58) Field of Classification Search
CPC .......................................... H04B 10/114–116
See application file for complete search history.

(56) References Cited

U.S. PATENT DOCUMENTS

| | | | |
|---|---|---|---|
| 2006/0168496 A1* | 7/2006 | Steele | H03M 13/09 714/758 |
| 2016/0156420 A1* | 6/2016 | Druml | H04B 10/1149 398/40 |
| 2017/0187721 A1* | 6/2017 | Raynor | G01S 7/006 |
| 2018/0031728 A1 | 2/2018 | Han | |

(Continued)

FOREIGN PATENT DOCUMENTS

| | | |
|---|---|---|
| CN | 101031072 A | 9/2007 |
| CN | 102624954 A | 8/2012 |

(Continued)

OTHER PUBLICATIONS

International search report issued in corresponding international application No. PCT/CN2020/098585 dated Sep. 28, 2020.

(Continued)

*Primary Examiner* — Nathan M Cors
(74) *Attorney, Agent, or Firm* — Young Basile Hanlon & MacFarlane, P.C.

(57) ABSTRACT

A mobile terminal is provided. The mobile terminal includes a light emitter, a light receiver, a light fidelity (LiFi) controller coupled with the light emitter and the light receiver, and a time-of-flight (TOF) controller coupled with the light emitter and the light receiver. The LiFi controller is configured to control the light emitter to emit a signal and control the light receiver to receive another signal. The TOF controller is configured to control the light emitter to emit a measurement light and determine a measured distance by performing distance measurement according to a reflected light of the measurement light received by the light receiver.

16 Claims, 3 Drawing Sheets

(56) References Cited

U.S. PATENT DOCUMENTS

| | | |
|---|---|---|
| 2018/0115364 A1 | 4/2018 | Venugopalan Nair Jalakumari et al. |
| 2018/0196139 A1 | 7/2018 | Brown et al. |
| 2018/0217229 A1* | 8/2018 | Shukla .................. G01S 17/87 |
| 2018/0356499 A1 | 12/2018 | Huang |
| 2019/0386744 A1* | 12/2019 | Plank ................. H04B 10/1143 |

FOREIGN PATENT DOCUMENTS

| | | |
|---|---|---|
| CN | 203385858 U | 1/2014 |
| CN | 104869252 A | 8/2015 |
| CN | 104991244 A | 10/2015 |
| CN | 106443696 A | 2/2017 |
| CN | 106681762 A | 5/2017 |
| CN | 106767707 A | 5/2017 |
| CN | 106911382 A | 6/2017 |
| CN | 107994945 A | 5/2018 |
| CN | 207339855 U | 5/2018 |
| CN | 108957470 A | 12/2018 |
| CN | 109245823 A | 1/2019 |
| CN | 208369589 U | 1/2019 |
| WO | 2018063486 A1 | 4/2018 |
| WO | 2018133089 A1 | 7/2018 |

OTHER PUBLICATIONS

"A new generation, long distance ranging Time-of-Flight sensor based on ST's FlightSense TM technology"; VL53L1X; Nov. 2018; DocID031281 Rev 3; pp. 1-35.

Time of Flight Camera; Wikipedia; pp. 1-14; Sep. 18, 2020.

Extended European search report issued in corresponding European application No. 20182448.9 dated Sep. 16, 2020.

China First Office Action with English Translation for CN Application 201910577344.1 dated Feb. 24, 2021 (21 pages).

China Second Office Action with English Translation issued in corresponding CN application No. 201910577344.1 dated Aug. 27, 2021.

First Examination report issued in corresponding IN application No. 202014027003 dated Aug. 31, 2021.

* cited by examiner

MOBILE TERMINAL

CROSS-REFERENCE TO RELATED APPLICATION(S)

This application claims priority to Chinese Patent Application 201910577344.1, filed on Jun. 28, 2019, the disclosure of which is hereby incorporated by reference in its entirety.

TECHNICAL FIELD

This disclosure relates to the field of Internet technology, and particularly to a mobile terminal.

BACKGROUND

Light fidelity (LiFi) technology is a light-WiFi technology, in which data transmission is achieved by using lights emitted by LED lamps as a transmission tool for network signals. LiFi has gradually become a hot research topic in the Internet field because of its low radiation, low energy consumption, as well as low carbon footprint for environmental conservation.

When applying LiFi technology to a mobile terminal, it is often necessary to add an LED light in the mobile terminal and define a hole in a housing of the mobile terminal corresponding to the LED light, which occupies an internal space of the mobile terminal, and affects aesthetics of the mobile terminal.

SUMMARY

In a first aspect of the disclosure, a mobile terminal is provided. The mobile terminal includes a light emitter, a light receiver, a light fidelity (LiFi) controller coupled with the light emitter and the light receiver, and a time-of-flight (TOF) controller coupled with the light emitter and the light receiver. The LiFi controller is configured to control the light emitter to emit a signal and control the light receiver to receive another signal. The TOF controller is configured to control the light emitter to emit a measurement light and determine a measured distance by performing distance measurement according to a reflected light of the measurement light received by the light receiver.

In a second aspect of the disclosure, a mobile terminal is provided. The mobile terminal includes a TOF module and a LiFi controller. The TOF module includes a light emitter, a light receiver, and a TOF controller coupled with the light emitter and the light receiver. The LiFi controller is coupled with the light emitter and the light receiver. The TOF controller is configured to control the light emitter to emit a measurement light and determine a measured distance by performing distance measurement according to a reflected light of the measurement light received by the light receiver. The LiFi controller is configured to control the light emitter to emit a signal and control the light receiver to receive another signal.

Additional aspects and advantages of the disclosure will be given in part in the following description, part of which will become apparent from the following description or be learned through practice.

BRIEF DESCRIPTION OF THE DRAWINGS

The foregoing and/or additional aspects and advantages of the disclosure will be readily apparent from the following description of the implementations taken in conjunction with accompanying drawings.

DETAILED DESCRIPTION

Figure 1:
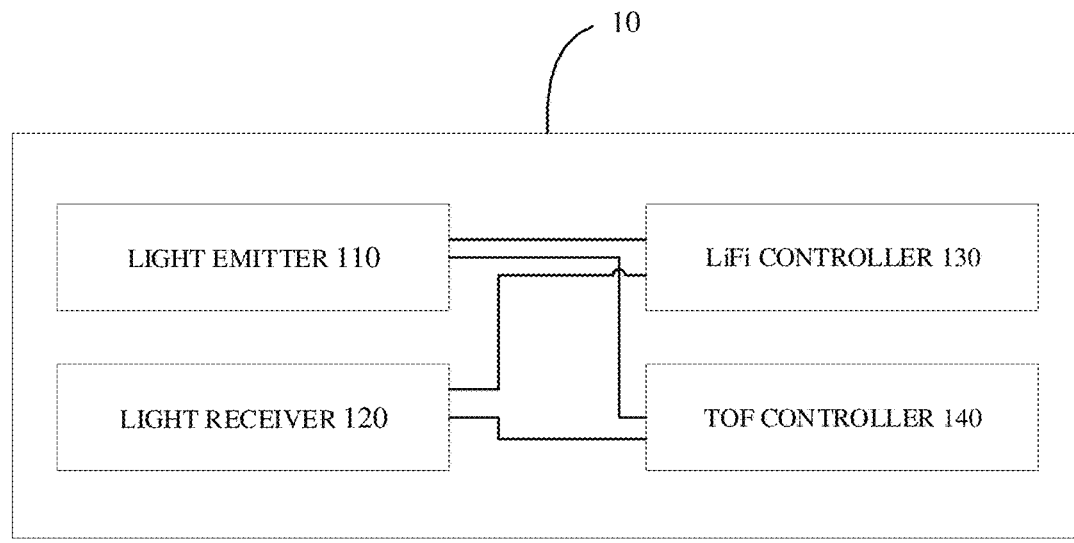
FIG. 1 is a schematic structural diagram illustrating a mobile terminal according to some implementations.

Implementations of the disclosure are described in detail below. Examples of the implementations are illustrated in the accompanying drawings, where throughout the context, the same or similar reference numerals are used to represent the same or similar elements or elements having the same or similar functions. The example implementations described below with reference to the drawings are intended to explain rather than limit the disclosure.

Hereinafter, a mobile terminal of implementations will be described in detail with reference to the accompanying drawings.

According to implementations of the disclosure, a mobile terminal is provided. The mobile terminal includes a light emitter, a light receiver, a light fidelity (LiFi) controller coupled with the light emitter and the light receiver, and a time-of-flight (TOF) controller coupled with the light emitter and the light receiver. The LiFi controller is configured to control the light emitter to emit and control the light receiver to receive. The TOF controller is configured to control the light emitter to emit a measurement light and determine a measured distance by performing distance measurement according to a reflected light of the measurement light received by the light receiver.

According to implementations of the disclosure, a mobile terminal is provided. The mobile terminal includes a TOF module and a LiFi controller. The TOF module includes a light emitter, a light receiver, and a TOF controller coupled with the light emitter and the light receiver. The LiFi controller is coupled with the light emitter and the light receiver. The TOF controller is configured to control the light emitter to emit a measurement light and determine a measured distance by performing distance measurement according to a reflected light of the measurement light received by the light receiver. The LiFi controller is configured to control the light emitter to emit and control the light receiver to receive.

Generally, a mobile terminal is equipped with a TOF module to realize various functions. For example, TOF has been widely used on mobile phones. A TOF module disposed close to a front surface of the mobile phone can be used for distance measurement, and a 3D TOF module disposed close to a rear surface of the mobile phone can be used for a somatosensory gaming purpose. For a mobile terminal applying a TOF technology, it is necessary to define two holes in a housing of the mobile terminal to realize emission and reception of lights. If the mobile terminal also wants to apply a LiFi technology, an LED light and a corresponding hole are required, which results in an increased number of holes in the housing of the mobile terminal, thereby affecting integrity and aesthetics of the housing of the mobile terminal.

In the mobile terminal of the implementations, LiFi communication is implemented with an existing TOF module of the mobile terminal, without the need of additional LED lights and holes, which can reduce the cost. Moreover, integrity of a housing of the mobile terminal can be ensured, thereby improving aesthetics of the mobile terminal.

FIG. 1 is a schematic structural diagram illustrating a mobile terminal according to some implementations. The mobile terminal may be a smart phone, a tablet computer, a wearable device, or the like.

As illustrated in FIG. 1, a mobile terminal 10 includes a light emitter 110, a light receiver 120, a LiFi controller 130 coupled with the light emitter 110 and the light receiver 120, and a TOF controller 140 coupled with the light emitter 110 and the light receiver 120.

The LiFi controller 130 is configured to control the light emitter 110 to emit a (LiFi) signal and control the light receiver 120 to receive another (LiFi) signal.

The TOF controller 140 is configured to control the light emitter 110 to emit a measurement light(s) and determine a measured distance by performing distance measurement according to a reflected light(s) of the measurement light(s) received by the light receiver 120.

In this implementation, each of the LiFi controller 130 and the TOF controller 140 is coupled with the light emitter 110 and the light receiver 120, so that LiFi and TOF can share the light emitter and the light receiver. The mobile terminal is originally equipped with a TOF module configured to realize distance measurement by emitting a light and receiving a reflected light, that is, the TOF module includes a light emitter and a light receiver. To this end, in this disclosure, a scheme to realize LiFi communication by using the light emitter and the light receiver of the TOF module is proposed. According to this scheme, LiFi communication can be realized without additional LED lights, which can save an internal space and cost of the mobile terminal.

In this implementation, the LiFi controller 130 is provided in the mobile terminal 10 to control the light emitter 110 to emit a LiFi signal and control the light receiver 120 to receive a LiFi signal, in this way, LiFi communication can be realized.

As an example, the mobile terminal of implementations of the disclosure is a smart phone. The smart phone is provided with a TOF module. The TOF module includes a light emitter and a light receiver. In this implementation, in order to realize LiFi communication, the smart phone is provided with a LiFi controller connected with the light emitter and the light receiver of the TOF module, so that the LiFi and the TOF share the light emitter and the light receiver. The LiFi controller is configured to control the light emitter to emit a LiFi signal and control the light receiver to receive a LiFi signal, so that the smart phone provided with the LiFi controller can communicate with other mobile terminals capable of LiFi communication, such as realizing direct communication between two smart phones.

It should be noted that, a lower layer of the LiFi protocol is compatible with the WiFi 802.11 baseband. When transmitting data, one-to-many or many-to-one simultaneous transmission can be realized based on a WiFi TDD protocol. Since lights travel in a straight line and only mobile terminals on the line can intercept information, data transmission using LiFi technology has high security. Moreover, LiFi has low latency and therefore is applicable to scenarios that require fast data transmission, such as quickly sharing files, exchanging business card and other contact information, and watching videos, and the like.

In this implementation, the TOF controller 140 controls the light emitter 110 to emit a measurement light, and then the measurement light is reflected by an obstacle. The light receiver 120 receives a reflected light of the measurement light. The TOF controller 140 determines a measured distance by performing distance measurement according to the reflected light.

In one implementation, the TOF controller 140 obtains the measured distance through calculation and conversion according to a phase difference or a time difference between the measurement light and the reflected light.

It should be noted that, TOF technology is a relatively mature ranging technology, and the existing TOF-based ranging methods are applicable to the disclosure, which will not be described in further detail herein.

According to the mobile terminal of implementations, the light emitter, the light receiver, the LiFi controller coupled with the light emitter and the light receiver, and the TOF controller coupled with the light emitter and the light receiver are provided. The LiFi controller is configured to control the light emitter to emit a LiFi signal and control the light receiver to receive a LiFi signal. The TOF controller is configured to control the light emitter to emit a measurement light and determine a measured distance by performing distance measurement according to a reflected light of the measurement light received by the light receiver. In this way, data transmission function of LiFi can be combined with TOF. The LiFi and the TOF are configured to share the light emitter and the light receiver, as such, LiFi-based data transmission can be realized with a TOF module of the mobile terminal, without the need for additional LED lights in the mobile terminal. This can save an internal space and cost of the mobile terminal as well as avoid defining a hole in a housing of the mobile terminal and thus ensure integrity and aesthetics of the housing of the mobile terminal. In addition, by emitting a LiFi signal with the light emitter and receiving a LiFi signal with the light receiver, and LiFi communication can be realized with good directivity and short transmission distance. Compared with electromagnetic wave communication, in LiFi communication, information leakage is less likely to occur, thereby improving security of data transmission. Data transmission based on optical communication has no limitation on a frequency band, so it will not be interfered and therefore, reliability of data transmission can be ensured.

The existing LiFi technology uses visible lights for data transmission. Due to a limited transmission distance of visible lights, data transmission is limited in distance. For this reason, in one implementation, the light emitter 110 is configured to emit invisible lights. For example, the light emitter 110 emits infrared lights. Because infrared lights have a longer wavelength than visible lights and have strong penetrating ability, transmitting a LiFi signal through infrared lights can increase data transmission distance.

In one implementation, the light emitter 110 is a laser emitter, and the light receiver 120 is a photodiode or an avalanche diode.

In the implementation, the avalanche diode may be an avalanche photodiode (APD). The APD has a "multiplicative" effect. With the same amount of lights, a photocurrent generated by the APD is tens or even hundreds of times larger than a photocurrent generated by the photodiode, that is, APD has a function of light amplification, therefore, sensitivity of the light receiver can be greatly improved. Compared with the light receiver using a photodiode, sensitivity of the light receiver using the APD can be increased by more than 10 dB. Taking the above into consideration, in an example implementation, an APD is used as the light receiver to receive a LiFi signal or a measurement light emitted by a laser emitter.

In one implementation, the LiFi controller 130 and the TOF controller 140 are integrated and packaged. The LiFi controller 130 and the TOF controller 140 are packaged inside one module, which facilitates optimizing the layout of internal wiring of the mobile terminal and reducing the difficulty of the internal wiring of the mobile terminal.

In one implementation, the LiFi controller 130 is provided with a high speed data interface (HSDI) to ensure data transmission rate. With aid of the HSDI, the LiFi controller 130 is coupled with the light emitter 110 and the light receiver 120 via a high speed data line, so that transmission rate and reception rate of LiFi signals can be increased.

In one implementation, the TOF controller 140 is coupled with the light emitter 110 and the light receiver 120 via an I$^2$C data line. The I$^2$C data line includes a serial data line and a serial clock line and is used to transfer information between the TOF controller 140 and the light emitter 110 and transfer information between the TOF controller 140 and the light receiver 120.

Figure 2:
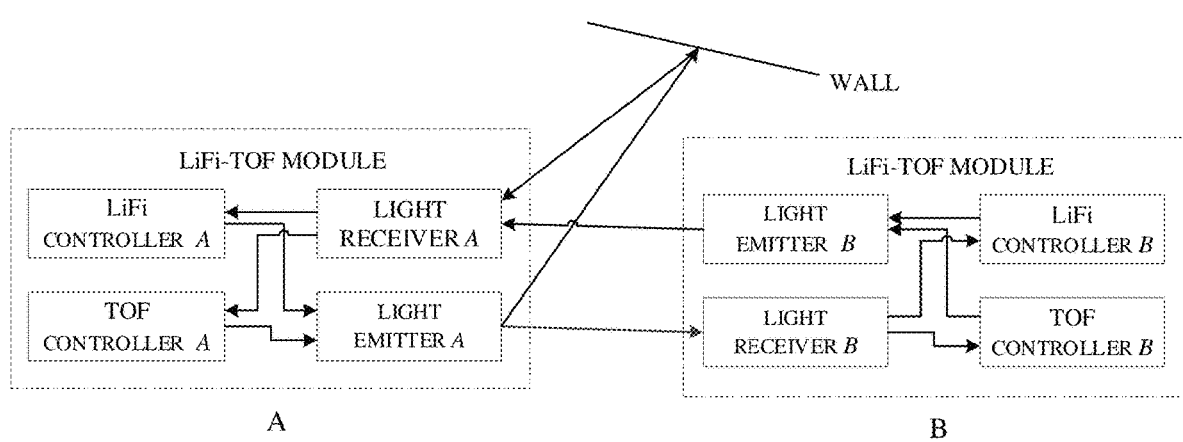
FIG. 2 is a principle schematic diagram illustrating a light emitter and a light receiver shared by LiFi and TOF in a mobile terminal according to some implementations.

FIG. 2 is a principle schematic diagram illustrating a light emitter and a light receiver shared by LiFi and TOF in a mobile terminal according to some implementations. Each of component A and component B illustrated in FIG. 2 represents the mobile terminal proposed herein. As illustrated in FIG. 2, the mobile terminal is provided with a LiFi-TOF module. A LiFi controller and a TOF controller are integrated and packaged inside the LiFi-TOF module. The LiFi controller is coupled with a laser emitter and a laser receiver, the TOF controller is also coupled with the laser emitter and the laser receiver, in this way, the LiFi and the TOF share the light emitter and the light receiver. The LiFi controller is coupled with the light emitter and the light receiver via a high speed data line, and coupled with other modules of the mobile terminal (e.g., a processor) via the high speed data line. The TOF controller is coupled with the light emitter and the light receiver via an I$^2$C data line, and coupled with other modules of the mobile terminal (e.g., a controller) via the I$^2$C data line. When mobile terminal A communicates with mobile terminal B, a light receiver of mobile terminal A (i.e., light receiver A in FIG. 2) receives a LiFi signal emitted by a light emitter of mobile terminal B (i.e., light emitter B in FIG. 2), and then a LiFi controller of mobile terminal A (i.e., LiFi controller A in FIG. 2) obtains the LiFi signal from light receiver A. Similarly, a light receiver of mobile terminal B (i.e., light receiver B in FIG. 2) receives a LiFi signal emitted by a light emitter of mobile terminal A (i.e., light emitter A in FIG. 2), and then a LiFi controller of mobile terminal B (i.e., LiFi controller B in FIG. 2) obtains the LiFi signal from light receiver B.

When mobile terminal A performs distance measurement based on TOF, as illustrated in FIG. 2, a measurement light emitted by light emitter A is reflected by an obstacle (e.g., a wall in FIG. 2), and then light receiver A receives a reflected light. TOF controller A obtains a measured distance by performing distance measurement according to the reflected light received by light receiver A. As such, distance measurement can be realized.

Figure 3:
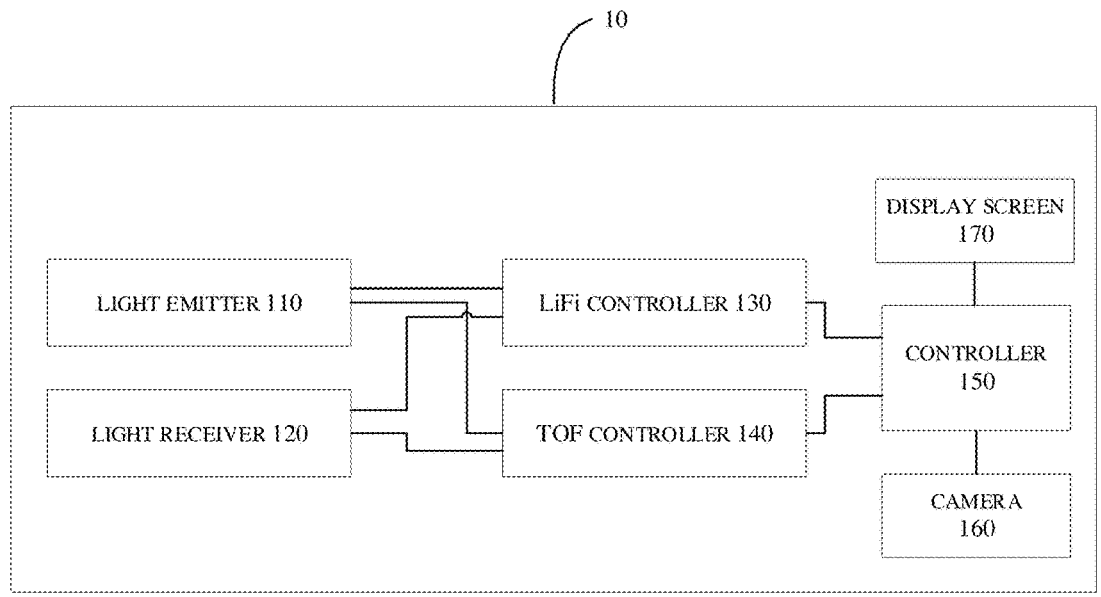
FIG. 3 is a schematic structural diagram illustrating a mobile terminal according to some other implementations.

FIG. 3 is a schematic structural diagram illustrating a mobile terminal according to some other implementations.

In one implementation, based on the implementations described in conjunction with FIG. 2, the mobile terminal 10 illustrated in FIG. 3 further includes a controller 150.

The controller 150 is coupled with the LiFi controller 130 and the TOF controller 140. The controller 150 is configured to obtain a type of an application currently running on the mobile terminal 10 and turn on the LiFi controller or the TOF controller according to the type of the application.

In one implementation, the application currently running on the mobile terminal 10 is embodied as an Internet related application. It should be understood that, the Internet related application herein may be any application that needs to access to a network, which is not limited herein. The application currently running on the mobile terminal 10 is a browser for example, it can be determined that the user needs Internet access, and the controller 150 turns on the LiFi controller 130 to emit or receive a LiFi signal, thereby satisfying the users' need for Internet access. In another example, the application currently running on the mobile terminal 10 is an APP store application, it can be determined that the user needs Internet access to download files, and the controller 150 turns on the LiFi controller 130 to emit or receive a LiFi signal.

In another implementation, the application currently running on the mobile terminal 10 is embodied as a call related application (or can be referred to as "phone-call related application"). It should be understood that, the call related application herein may be any application that makes a call, which is not limited herein. The application currently running on the mobile terminal 10 is a calling application for example, it can be determined that there is currently a need for active control of the mobile terminal to be in a screen-off state, and the controller 150 turns on the TOF controller 140 to determine a distance between the mobile terminal 10 and the user. When the distance is shorter than a preset threshold, control the mobile terminal 10 to be in a screen-off state. For example, the mobile terminal 10 gets close to the user's ear when the user is answering a call, and the mobile terminal 10 control a screen to be in the screen-off state.

In one implementation, the light emitter 110 and the light receiver 120 are disposed close to a front surface of the mobile terminal 10. In the implementation, the mobile terminal 10 further includes a display screen 170. The front surface of the mobile terminal 10 refers to a surface where the display screen is located. In the implementation, the controller 150 is further configured to control an on/off state of the display screen according to the measured distance determined by the TOF controller 140.

The mobile terminal is a smart phone for example. When the user answers a call through the smart phone, the controller 150 turns on the TOF controller 140. Then, the TOF controller 140 controls the light emitter 110 to emit a measurement light, and the measurement light is reflected after reaching a human body. The light receiver 120 receives a reflected light. The TOF controller 140 determines a measured distance by performing distance measurement according to the reflected light. The controller 150 compares the measured distance with a preset distance. If the measured distance is shorter than the preset distance, a switch of the display screen is controlled to be off, so that the display screen is in the screen-off state when the user answers the call, as a result, power of the smart phone can be saved.

In one implementation, the light emitter 110 and the light receiver 120 are disposed close to a rear surface of the mobile terminal 10. The rear surface of the mobile terminal 10 refers to a surface opposite to the front surface. In the implementation, the mobile terminal 10 further includes a camera 160. The controller 150 is further configured to control the camera 160 for infrared focusing according to the measured distance determined by the TOF controller 140.

For example, when taking a picture with the mobile terminal 10, the controller 150 of the mobile terminal 10 turns on the TOF controller 140. Then, the TOF controller 140 controls the light emitter 110 to emit a measurement light, and the measurement light is reflected after reaching the human body. The light receiver 120 receives a reflected light. The TOF controller 140 determines a measured distance by performing distance measurement according to the reflected light. The controller 150 implements infrared autofocus according to the measured distance.

It should be noted that, TOF-based focusing technology has been well developed and will not be described in detail herein.

Figure 4:
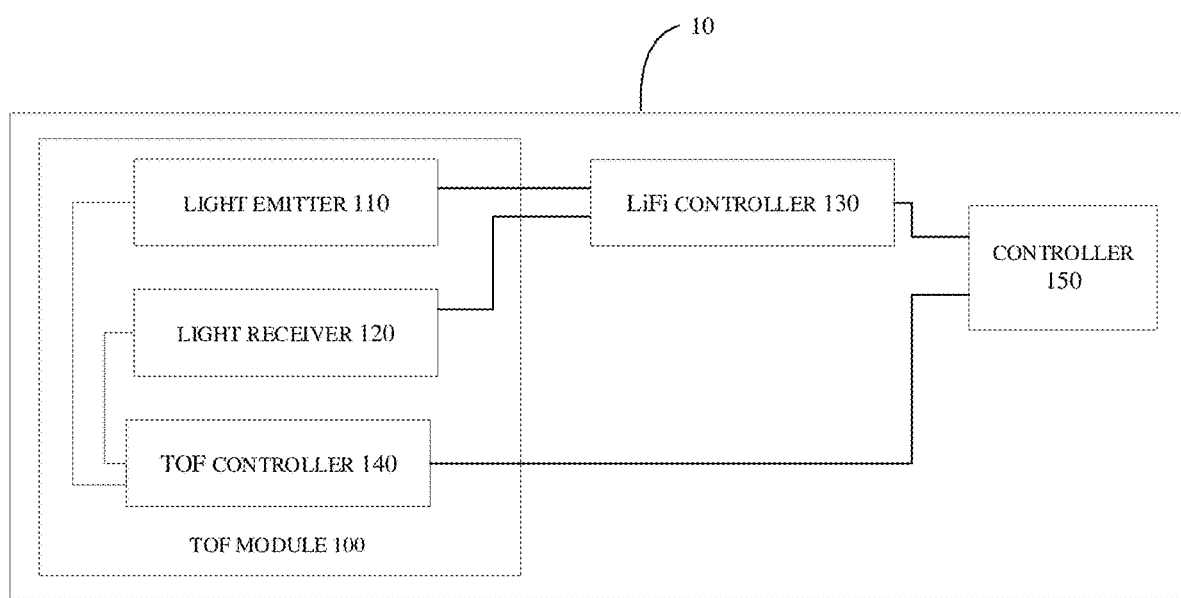
FIG. 4 is a schematic structural diagram illustrating a mobile terminal according to some other implementations.

FIG. 4 is a schematic structural diagram illustrating a mobile terminal according to some other implementations. As illustrated in FIG. 4, a mobile terminal 10 includes a TOF module 100 and a LiFi controller 130. The TOF module 100 includes a light emitter 110, a light receiver 120, and a TOF controller 140 coupled with the light emitter 110 and the light receiver 120. The LiFi controller 130 is coupled with the light emitter 110 and the light receiver 120. The TOF controller 140 is configured to control the light emitter 110 to emit a measurement light and determine a measured distance by performing distance measurement according to a reflected light of the measurement light received by the light receiver 120. The LiFi controller 130 is configured to control the light emitter 110 to emit a LiFi signal and control the light receiver 120 to receive another LiFi signal.

In one implementation, the LiFi controller 130 is coupled with the light emitter 110 and the light receiver 120 via a high speed data line.

In one implementation, the LiFi controller 130 is integrated with the TOF module.

In one implementation, the mobile terminal 10 further includes a controller 150 coupled with the LiFi controller 130 and the TOF controller 140. The controller 150 is configured to obtain a type of an application currently running on the mobile terminal and turn on the LiFi controller 130 or the TOF controller 140 according to the type of the application.

In one implementation, the controller 150 is configured to turn on the LiFi controller 130 when the application currently running is an Internet related application.

In one implementation, the controller 150 is configured to turn on the TOF controller 140 when the application currently running is a call related application.

In one implementation, the light receiver 120 includes a pixel array. The LiFi controller 130 is configured to control a part of pixels in the pixel array to receive lights to achieve angle adjustment of the lights received.

In one implementation, the light emitter 110 is configured to emit invisible lights.

Figure 5:
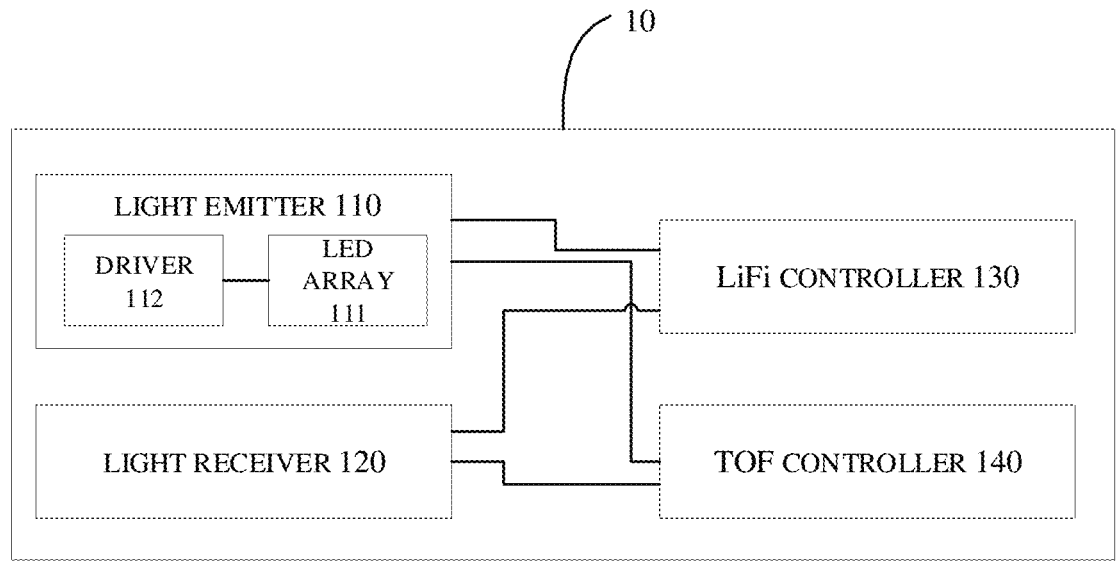
FIG. 5 is a schematic structural diagram illustrating a mobile terminal according to some other implementations.

FIG. 5 is a schematic structural diagram illustrating a mobile terminal according to some other implementations.

In one implementation, based on the implementations described in conjunction with FIG. 1, the light emitter 110 illustrated in FIG. 5 includes an LED array 111 and a driver 112 configured to control depth of the LED array.

In one implementation, the LED array is an infrared LED array that operates at an infrared frequency band.

In the implementation, the driver 112 is configured to control the depth of the LED array 111 in the light emitter to achieve angle adjustment of lights emitted by the light emitter 110.

It can be understood that, lights emitted by the light emitter are directional, that is, the lights are emitted at different angles. For example, the directionality of the infrared lights is about 30 degrees. When a distance between the LED array and a light outlet of the light emitter changes, the directionality of the lights changes accordingly. The closer the LED array is to the light outlet of the light emitter, the larger the angle at which the light emitter emits the lights. On the contrary, the farther the LED array is from the light outlet of the light emitter, the smaller the angle at which the light emitter emits the lights.

According to implementations, the driver is configured to adjust the depth of the LED array in the light emitter, so that a direction of lights is adjustable.

In this implementation, the light receiver 120 includes a pixel array. The LiFi controller 130 is configured to control a part of pixels in the pixel array to receive lights to achieve angle adjustment of the lights received.

It can be understood that, when different pixels in the pixel array are used to receive lights, angles of the lights received by the light receiver 120 are different. To facilitate understanding, the following will give a detailed description in conjunction with FIG. 6.

Figure 6:
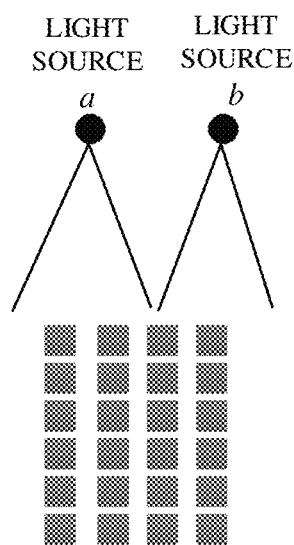
FIG. 6 is an example schematic diagram illustrating reception of lights at different angles by different pixels of a pixel array.

FIG. 6 is an example schematic diagram illustrating reception of lights at different angles by different pixels in a pixel array. As illustrated in FIG. 6, when receiving lights emitted by light source a, pixels in the left three columns of the pixel array can be used to receive the lights. When receiving lights emitted by light source b, pixels in the right two columns of the pixel array can be used to receive the lights.

According to implementations, the LiFi controller is configured to control a part of pixels in the pixel array to receive lights, so that angle adjustment of the lights received can be achieved, therefore directivity-controllable LiFi-based data transmission can be achieved.

The terms "one implementation", "some implementations", "examples", "specific examples", "some examples", or the like used in the specification of the disclosure means that particular features, structures, materials, or properties described in conjunction with the implementations or examples may be defined in at least one implementation or example of the disclosure. The phrase "implementation/example" appearing in various places of the specification does not necessarily refer to a same implementation or example. Moreover, the particular features, structures, materials, or properties described may be combined in any suitable manner in any one or more implementations or examples. In addition, without any contradiction, those skilled in the art may combine different implementations or examples and combine features of the different implementations or examples described in the specification.

In addition, the terms "first", "second", or the like are for descriptive purposes only, and should not be understood as indicating or implying relative importance or implied indication of the number of technical features indicated. Thus, features defined by "first" and "second" may explicitly or implicitly include one or more of the features. In the description of the disclosure, unless expressly limited otherwise, "multiple" means two or more.

Functional units in various implementations of the disclosure may be integrated into one processing unit, or each unit may be physically present, or two or more units may be integrated into one unit. The above-mentioned integrated unit can be implemented in a form of hardware or a software function unit. The integrated unit may be stored in a computer readable storage medium when it is implemented in the form of a software functional unit and is sold or used as a separate product.

The foregoing storage medium may be a read-only memory, a magnetic disk, an optical disk, or the like. While the disclosure has been described in connection with certain implementations, it is to be understood that the foregoing implementations are merely illustrative examples, and the scope of the disclosure is not limited thereto. As will occur to those skilled in the art, the disclosure is susceptible to various changes, modifications, substitutions, and improvements made thereto without departing from the scope of the disclosure.

What is claimed is:

1. A mobile terminal, comprising:
a light emitter;
a light receiver;
a light fidelity (LiFi) controller coupled with the light emitter and the light receiver, and configured to control the light emitter to emit a signal and control the light receiver to receive another signal;
a time-of-flight (TOF) controller coupled with the light emitter and the light receiver, and configured to control the light emitter to emit a measurement light and determine a measured distance by performing distance measurement according to a reflected light of the measurement light received by the light receiver; and
a controller coupled with the LiFi controller and the TOF controller, and configured to obtain a type of an application currently running on the mobile terminal and turn on the LiFi controller or the TOF controller according to the type of the application; wherein the controller is configured to:
turn on the LiFi controller when the application currently running is an Internet related application; and
turn on the TOF controller when the application currently running is a call related application.

2. The mobile terminal of claim 1, wherein the light emitter and the light receiver are disposed close to a front surface of the mobile terminal, the mobile terminal further comprises a display screen, and the controller is further configured to control an on/off state of the display screen according to the measured distance determined by the TOF controller.

3. The mobile terminal of claim 1, wherein the light emitter and the light receiver are disposed close to a rear surface of the mobile terminal, the mobile terminal further comprises a camera, and the controller is further configured to control the camera for infrared focusing according to the measured distance determined by the TOF controller.

4. The mobile terminal of claim 1, wherein the light emitter is a laser emitter, and the light receiver is a photodiode or an avalanche diode.

5. The mobile terminal of claim 1, wherein the LiFi controller and the TOF controller are integrated and packaged.

6. The mobile terminal of claim 1, wherein the LiFi controller is coupled with the light emitter and the light receiver via a high speed data line.

7. The mobile terminal of claim 1, wherein the TOF controller is coupled with the light emitter and the light receiver via an I²C data line.

8. The mobile terminal of claim 1, wherein the light receiver comprises a pixel array, and the LiFi controller is configured to control a part of pixels in the pixel array to receive lights to achieve angle adjustment of the lights received.

9. The mobile terminal of claim 1, wherein the light emitter is configured to emit invisible lights.

10. A mobile terminal, comprising:
a time-of-flight (TOF) module, comprising:
a light emitter;
a light receiver comprising a pixel array; and
a TOF controller coupled with the light emitter and the light receiver, and configured to control the light emitter to emit a measurement light and determine a measured distance by performing distance measurement according to a reflected light of the measurement light received by the light receiver; and
a light fidelity (LiFi) controller coupled with the light emitter and the light receiver, and configured to:
control the light emitter to emit a signal;
control the light receiver to receive another signal; and
control a part of pixels in the pixel array to receive lights to achieve angle adjustment of the lights received.

11. The mobile terminal of claim 10, wherein the LiFi controller is coupled with the light emitter and the light receiver via a high speed data line.

12. The mobile terminal of claim 10, wherein the LiFi controller is integrated with the TOF module.

13. The mobile terminal of claim 10, further comprising:
a controller coupled with the LiFi controller and the TOF controller, and configured to obtain a type of an application currently running on the mobile terminal and turn on the LiFi controller or the TOF controller according to the type of the application.

14. The mobile terminal of claim 13, wherein the controller is configured to:
turn on the LiFi controller when the application currently running is an Internet related application; and
turn on the TOF controller when the application currently running is a call related application.

15. The mobile terminal of claim 10, wherein the light emitter is configured to emit invisible lights.

16. A mobile terminal, comprising:
a light emitter;
a light receiver;
a light fidelity (LiFi) controller coupled with the light emitter and the light receiver, and configured to control the light emitter to emit a signal and control the light receiver to receive another signal;
a time-of-flight (TOF) controller coupled with the light emitter and the light receiver, and configured to control the light emitter to emit a measurement light and determine a measured distance by performing distance measurement according to a reflected light of the measurement light received by the light receiver;
a controller coupled with the LiFi controller and the TOF controller, and configured to obtain a type of an application currently running on the mobile terminal and turn on the LiFi controller or the TOF controller according to the type of the application; and
wherein the mobile terminal further comprises at least one of:
the light emitter and the light receiver being disposed close to a front surface of the mobile terminal, the mobile terminal further comprises a display screen, and the controller is further configured to control an on/off state of the display screen according to the measured distance determined by the TOF controller; or
the light emitter and the light receiver being disposed close to a rear surface of the mobile terminal, the mobile terminal further comprises a camera, and the controller is further configured to control the camera for infrared focusing according to the measured distance determined by the TOF controller.

* * * * *